United States Patent
Beck (10) Patent No.: US 11,017,941 B2
(45) Date of Patent: May 25, 2021

(54) ISOLATION TRANSFORMER WITH LOW UNWANTED RESONANCES, ENERGY TRANSFER DEVICE HAVING AN ISOLATION TRANSFORMER AND ENERGY TRANSFER DEVICE FOR WIRELESS TRANSFER OF ENERGY HAVING AN ISOLATION TRANSFORMER

(71) Applicant: TDK Electronics AG, Munich (DE)

(72) Inventor: Fabian Beck, Rüttenen (CH)

(73) Assignee: TDK Electronics AG, München (DE)

( * ) Notice: Subject to any disclaimer, the term of this patent is extended or adjusted under 35 U.S.C. 154(b) by 4 days.

(21) Appl. No.: 16/462,205

(22) PCT Filed: Nov. 17, 2016

(86) PCT No.: PCT/EP2016/078069
§ 371 (c)(1),
(2) Date: May 17, 2019

(87) PCT Pub. No.: WO2018/091098
PCT Pub. Date: May 24, 2018

(65) Prior Publication Data
US 2019/0333692 A1    Oct. 31, 2019

(51) Int. Cl.
*H01F 27/42* (2006.01)
*H02J 50/12* (2016.01)
*H01F 27/24* (2006.01)
*H01F 27/28* (2006.01)
*H01F 38/14* (2006.01)
*H02J 7/02* (2016.01)

(52) U.S. Cl.
CPC .......... *H01F 27/42* (2013.01); *H01F 27/24* (2013.01); *H01F 27/28* (2013.01); *H01F 38/14* (2013.01); *H02J 50/12* (2016.02); *H02J 7/025* (2013.01)

(58) Field of Classification Search
CPC ... H02J 50/12; H02J 7/025; H01F 27/24–266; H01F 27/28–327; H01F 2038/146; H01F 2038/143; H01F 38/14
See application file for complete search history.

(56) References Cited

U.S. PATENT DOCUMENTS

| 4,763,235 A | 8/1988 | Morita |
| 2006/0056205 A1 | 3/2006 | Kyono |
| 2008/0013350 A1* | 1/2008 | Goliszek .................. H01F 27/38 363/68 |
| 2012/0133469 A1* | 5/2012 | Tomonari ............... H01F 27/292 336/192 |

(Continued)

FOREIGN PATENT DOCUMENTS

| GB | 2440571 A | 2/2008 |
| JP | S6316418 U | 2/1988 |

(Continued)

*Primary Examiner* — Patrick C Chen
(74) *Attorney, Agent, or Firm* — Slater Matsil, LLP (57) ABSTRACT

An isolation transformer and an energy transfer device having an isolation transformer are disclosed. In an embodiments an isolation transformer includes an input winding, an output winding, a third winding, a capacitive element and a resistive element, wherein the capacitive element, the resistive element and the third winding are connected in series, and wherein the input winding, the output winding and the third winding are magnetically coupled.

12 Claims, 5 Drawing Sheets

(56) References Cited

U.S. PATENT DOCUMENTS

| | | | |
|---|---|---|---|
| 2015/0263528 A1* | 9/2015 | Kitamura | H01F 27/2804 |
| | | | 307/104 |
| 2015/0326031 A1* | 11/2015 | Yamaguchi | H02J 50/10 |
| | | | 307/104 |
| 2017/0141689 A1* | 5/2017 | Hatano | H02M 3/33546 |

FOREIGN PATENT DOCUMENTS

| | | | |
|---|---|---|---|
| JP | 10-66203 | * | 3/1998 |
| JP | 2014110662 A | | 6/2014 |
| WO | 2011124761 A2 | | 10/2011 |

* cited by examiner

ISOLATION TRANSFORMER WITH LOW UNWANTED RESONANCES, ENERGY TRANSFER DEVICE HAVING AN ISOLATION TRANSFORMER AND ENERGY TRANSFER DEVICE FOR WIRELESS TRANSFER OF ENERGY HAVING AN ISOLATION TRANSFORMER

This patent application is a national phase filing under section 371 of PCT/EP2016/078069, filed Nov. 17, 2016, which claims the priority of German patent application, filed, each of which is incorporated herein by reference in its entirety.

TECHNICAL FIELD

The invention relates to isolation transformers in which unwanted resonances are suppressed. The invention further relates to energy transfer devices, for example, for wireless energy transfer, having isolation transformers of this kind.

BACKGROUND

In systems for wireless energy transfer by energy transfer devices, electrical energy is, for example, by magnetic coupling, emitted by means of a transmitting coil and received by a receiving coil. In this way, mobile communication devices and motor vehicles can be charged in a contactless manner. Energy transfer devices of this kind can comprise an isolation transformer which provides galvanic isolation between an energy source and the transmitting coil.

One problem in systems for wireless energy transfer, in particular at high electrical powers, is energy loss due to low magnetic coupling between the two abovementioned coils. Transfer systems of this kind operate with an AC signal at a frequency in the kilohertz range. Parasitic inductive and capacitive elements within the path which the energy takes lead to leakage currents. In particular, resonances of matching elements can be formed by parasitic reactance elements of this kind and lead to a reduction in energy efficiency. In this case, unwanted resonances can occur at the operating frequency of the energy transfer system or at higher-order harmonics. Electromagnetic contamination of the area surrounding the energy transfer system is likewise disadvantageous since electrical power which is emitted but is not absorbed by the receiving coil is generally coupled in an unwanted manner to the surrounding area.

Interference modes which can lead to energy loss channels can comprise common-mode interference and differential-mode interference. One method for reducing common-mode interference involves providing a common-mode interference-suppression choke in the power path. In principle, an additional energy loss channel is produced by a common-mode interference-suppression choke. Moreover, common-mode interference-suppression chokes act only to a limited extent against interfering differential-mode resonances.

SUMMARY OF THE INVENTION

Embodiments provide a system for energy transfer, in particular for wireless energy transfer.

In various embodiments the isolation transformer has an input winding, an output winding and a third winding. Furthermore, the isolation transformer comprises a capacitive element and a resistive element. The capacitive element and the resistive element and also the third winding are connected in series. The input winding, the output winding and the third winding are magnetically coupled.

Therefore, an isolation transformer with reduced unwanted resonances is specified. By virtue of reducing unwanted resonances, the coupling factor of an associated energy transfer system is increased. The effect of parasitic capacitive and/or inductive elements is reduced. In particular, the formation of resonances at the operating frequency or at higher harmonics of the operating frequency is reduced. Overall, a higher degree of efficiency of the energy transfer device is achieved and interference in the area surrounding the transmission system is reduced as a result.

It is possible for the isolation transformer to have a transformer core. The input winding, the output winding and the third winding are wound onto the transformer core.

The transformer core can be a common ferrite or iron core. The transformer core can have a ferromagnetic yoke, so that the transformer core constitutes a closed path in respect of the magnetic flux. As an alternative, the transformer core can also be of rod-shaped design. The input winding, the output winding and the third winding can be wound onto the transformer core next to one another. In particular, the input winding and the output winding can be arranged on the transformer core separately from one another in order to ensure galvanic isolation of the windings.

It is possible for the input winding and the third winding to be arranged very close together. In particular, it is possible for the input winding and the third winding to be wound on the transformer core in a bifilar manner.

It is possible for the input winding and/or the third winding to cover the first and/or second winding. In particular, the third winding can cover the first or second winding.

Therefore, it is possible for the third winding to be wound directly onto the wound-up wire of the input winding.

Owing to an arrangement in which the third winding is arranged closer to the input winding than to the output winding, the couplings of the third winding to the input winding and, respectively, to the output winding can be set at different strengths. Therefore, the coupling of the third winding to the input winding can be stronger than the coupling to the output winding.

It is possible for the capacitor element, the resistive element and the third winding to form an attenuation circuit for unwanted resonances. The third winding has an inductance, the capacitive element has a capacitance and the resistive element has an electrical resistance. The inductance of the third winding and the capacitance of the capacitive element can form a resonant circuit, the resonant frequency of which is matched, for example, to the operating frequency of the isolation transformer or to a higher harmonic thereof. Owing to the electrical resistance of the resistive element, parasitic power can then be dissipated in a targeted manner. Without the attenuation circuit, via unwanted resonances would be irreversibly emitted from the energy transfer system.

It is possible for the resistive element to have an electrical resistance R which is greater than or equal to 1 ohm and less than or equal to 20 ohms. The capacitive element can have a capacitance C which is $\geq 0.5$ nF and $\leq 10$ nF. The third winding can have a number of turns N which is $\leq 5$ and $\leq 40$.

In general, it is the case here that the electrical resistance R, the capacitance C and the number of turns N of the circuit elements of the attenuation circuit can be matched to critical frequencies, for example, resonant frequencies, of the primary turns of the isolation transformer.

Here, the isolation transformer can have an operating frequency of between 50 and 100 kHz. A preferred operating frequency is, for example, 85 kHz. Accordingly, the impedance values of the circuit elements of the attenuation circuit can be matched to 85 kHz or to multiples of 85 kHz, for example, to two times, three times or four times 85 kHz.

It is possible for the input winding and the output winding to have an equal number of turns.

An isolation transformer of this kind substantially creates galvanic isolation between its input end and its output end, without substantially changing voltage values or current values. However, it is also possible for the ratio of turns to differ from 1. In this case, the isolation transformer can transform voltages and—inversely thereto—currents, in addition to providing galvanic isolation. Here, the ratio of turns can lie between 0.3 and 3.

It is possible for the input winding to have an inductance $L_r$ which is greater than or equal to 1 mH and less than or equal to 10 mH.

The transformer inductance $L_f$ can be, for example, 3.76 mH.

It is possible for the input winding to have $N_1$ turns and for the output winding to have $N_2$ turns. Here, the number of turns $N_1$ and $N_2$ can be 29 in each case. The electrical resistance R of the resistive element can be 10 ohms. The capacitance C of the capacitive element can be 2.2 nF. The number of turns $N_3$ of the third winding can be 22.

It is possible for the ratio of turns $N_3:N_1$ to be ≥0.5 and 1.0. In particular, the ratio of turns $N_3:N_1$ can substantially be 0.76 (29:22, rounded). This or a similar ratio of turns in the range of between 0.5 and 1.0 can also be by numbers of turns of the input windings or of the output windings which are different from the numbers of turns specified above.

An energy transfer device in which the surrounding area is subjected to fewer emissions can comprise an isolation transformer as specified above. In addition, an energy transfer device of this kind can comprise an inverter which is connected in series with the isolation transformer.

In addition thereto, the energy transfer device can comprise a common-mode choke which is connected in series with the isolation transformer.

If the energy transfer device comprises both an inverter and also a common-mode choke, the common-mode choke can be interconnected between the inverter and the isolation transformer.

The isolation transformer can also be used in an energy transfer device for wireless energy transfer. A corresponding energy transfer device also comprises a transmitting winding in addition to an isolation transformer and an inverter, which is connected in series with said isolation transformer, and possibly a common-mode choke, wherein the isolation transformer is interconnected between the transmitting winding and the inverter. A system for energy transfer is completed by way of having an additional receiving winding. Here, the transmitting winding can be interconnected between the receiving winding and the isolation transformer. Here, the energy transfer between the transmitting winding and the receiving winding takes place without physical contact between these windings. The transmitting winding and the receiving winding are preferably oriented in relation to one another such that coupling is at a maximum.

The energy transfer device for wireless energy transfer can then have an additional rectifier which is connected downstream of the receiving winding. The rectifier converts the electrical signal, for example, at the frequency 85 kHz, into a DC signal, for example, in order to charge the energy storage device, for example, a rechargeable battery, a mobile communication device, an automobile or a further electrically operated device.

BRIEF DESCRIPTION OF THE DRAWINGS

Essential principles of the isolation transformer and/or of the energy transfer device are shown using schematic figures.

In said figures.

DETAILED DESCRIPTION OF ILLUSTRATIVE EMBODIMENTS

Figure 1:
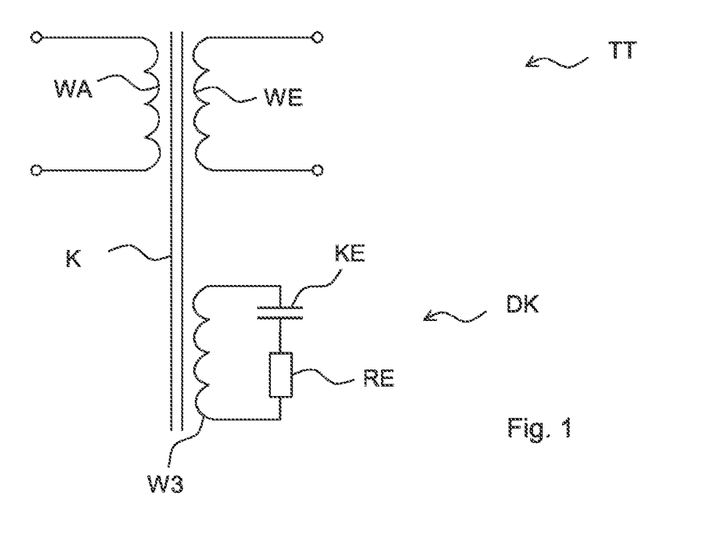
FIG. 1 shows an equivalent circuit diagram of the isolation transformer with an attenuation circuit.

FIG. 1 shows an equivalent circuit diagram of an improved isolation transformer IT which has an input winding WP and an output winding WA. The input winding WP and the output winding WA are magnetically coupled by means of a transformer core K. In addition, the isolation transformer TT has an attenuation circuit DK which has a third turn W3, a capacitive element KE and a resistive element RE. The third turn W3 is also magnetically coupled to the input winding WP and to the output winding WA by means of the transformer core K. The transformer core K is schematically illustrated. The transformer core K can be of rod-shaped design or form a magnetically closed circuit, for example, a U-shaped core with a yoke.

The attenuation circuit DK of the transformer core TT attenuates critical frequencies, so that critical resonances, which would lead to unwanted resonance, cannot even be produced in the first place.

Figure 2:
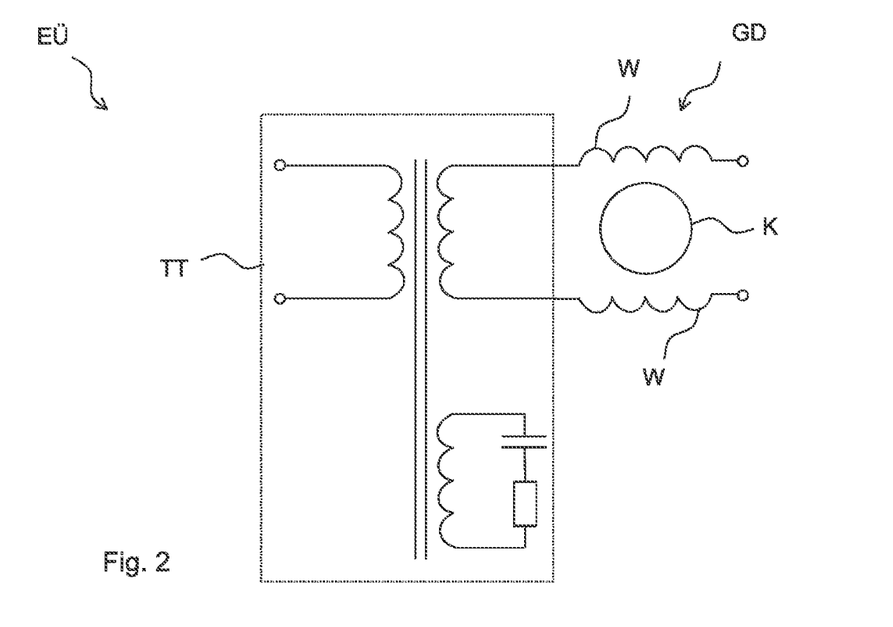
FIG. 2 shows the equivalent circuit diagram of an isolation transformer which is coupled to a common-mode choke.

FIG. 2 shows the optional circuit of the isolation transformer TT with a common-mode choke GD. The common-mode choke GD comprises a choke core K and two turns W. The dimensions of the core K and of the turns W are selected such that common-mode interference are suppressed to the maximum extent.

This produces an energy transfer device EÜ in which common-mode interference and critical resonances, for example, due to differential-mode signals, are greatly reduced.

Figure 3:
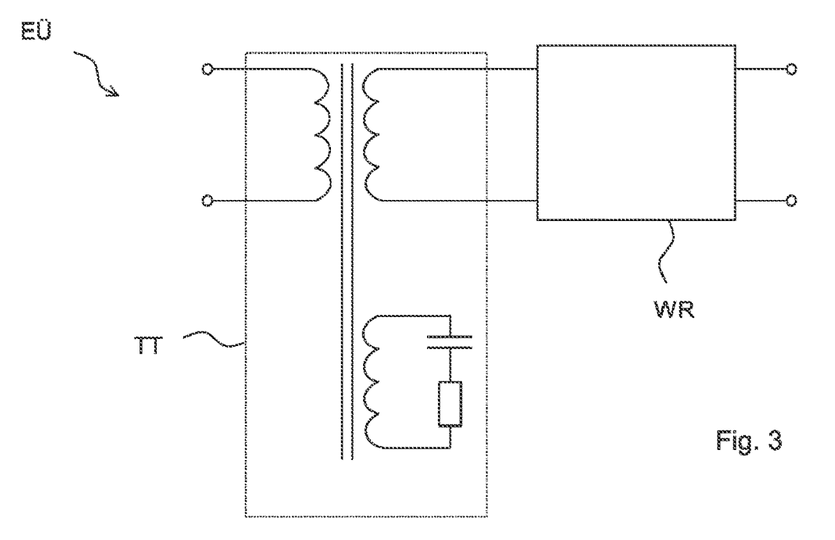
FIG. 3 shows the circuit of the isolation transformer with an inverter.

FIG. 3 shows the circuit of the energy transfer device EÜ with an inverter WR. The inverter receives electrical energy in the form of a direct current and passes an AC signal to the isolation transformer IT. The inverter WE can have a switch arrangement of NH configuration (H-bridge) here. The switches can be semiconductor switches. The applied AC current signal can then be, for example, a square wave with steep voltage edges. The operating frequency of the isolation transformer which is connected downstream of the inverter can be, for example, 85 kHz.

Figure 4:
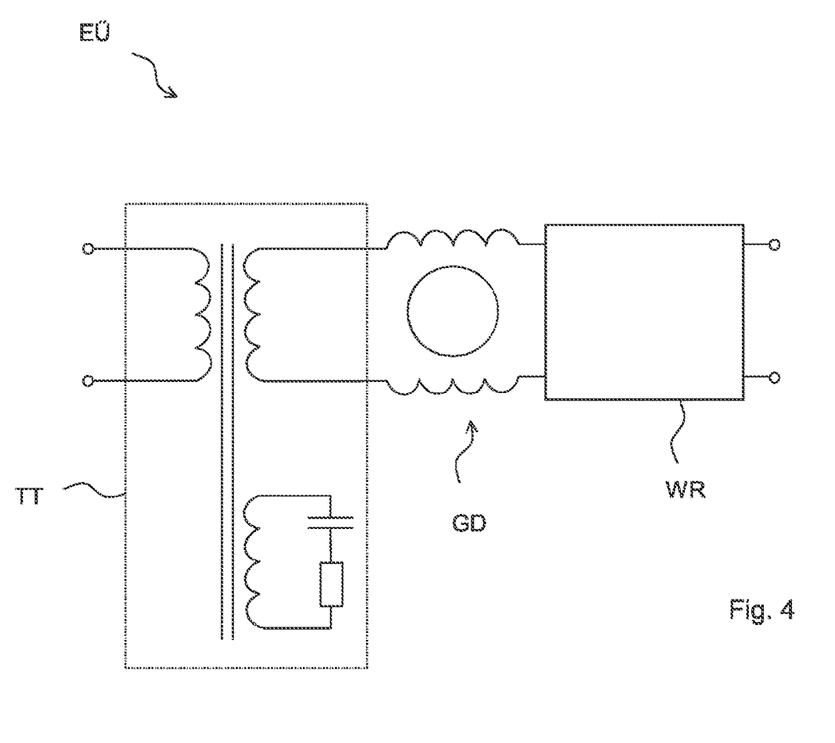
FIG. 4 shows the circuit of an isolation transformer with a common-mode choke and an inverter.
Figure 5:
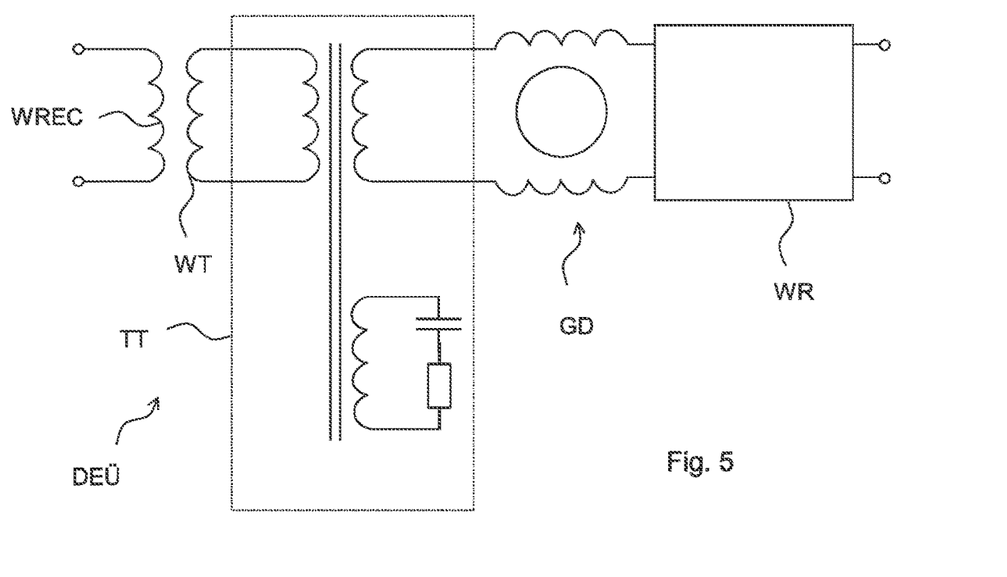
FIG. 5 shows the equivalent circuit diagram of a wireless energy transfer device with a transmitting winding and a receiving winding.

FIG. 4 shows a form of the energy transfer device in which the common-mode choke GD is interconnected between the isolation transformer TT and the inverter WR. FIG. 5 shows a system for wireless energy transfer. The wireless energy transfer device DEÜ has a transmitting winding WT in addition to the inverter WE, the common-mode choke GD and the isolation transformer TT. A magnetic or electromagnetic power signal can be output by means of the transmitting winding WT. This magnetic or electromagnetic power can be received and output to an area surrounding the circuit by means of a receiving winding WREC. The physical distance between the transmitting coil WT and the receiving coil WR can be between 3 and 20 cm.

Figure 6:
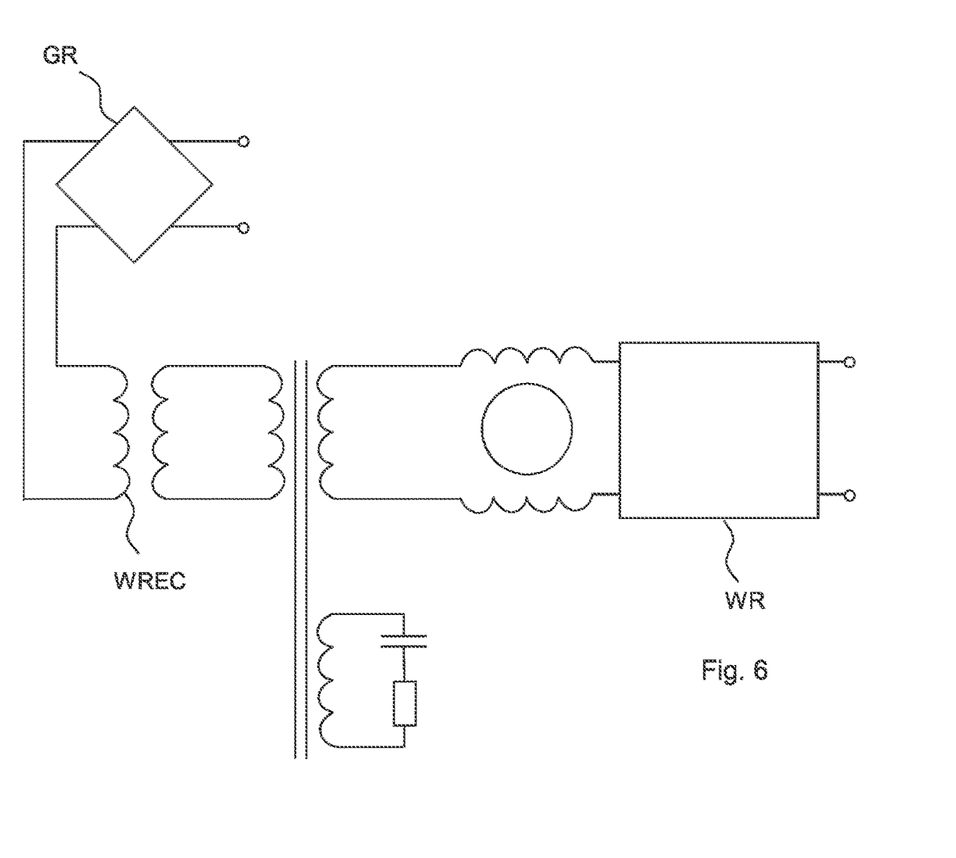
FIG. 6 shows the additional use of a rectifier.

FIG. 6 shows a wireless energy transfer device in which a rectifier GR is connected to the receiving winding WREC. The AC signal in the kilohertz range is converted by the rectifier GR back into a DC signal for use in a further circuit. Here, the rectifier can be a cross-type rectifier with four diodes and possibly smoothing capacitors.

Figure 7:
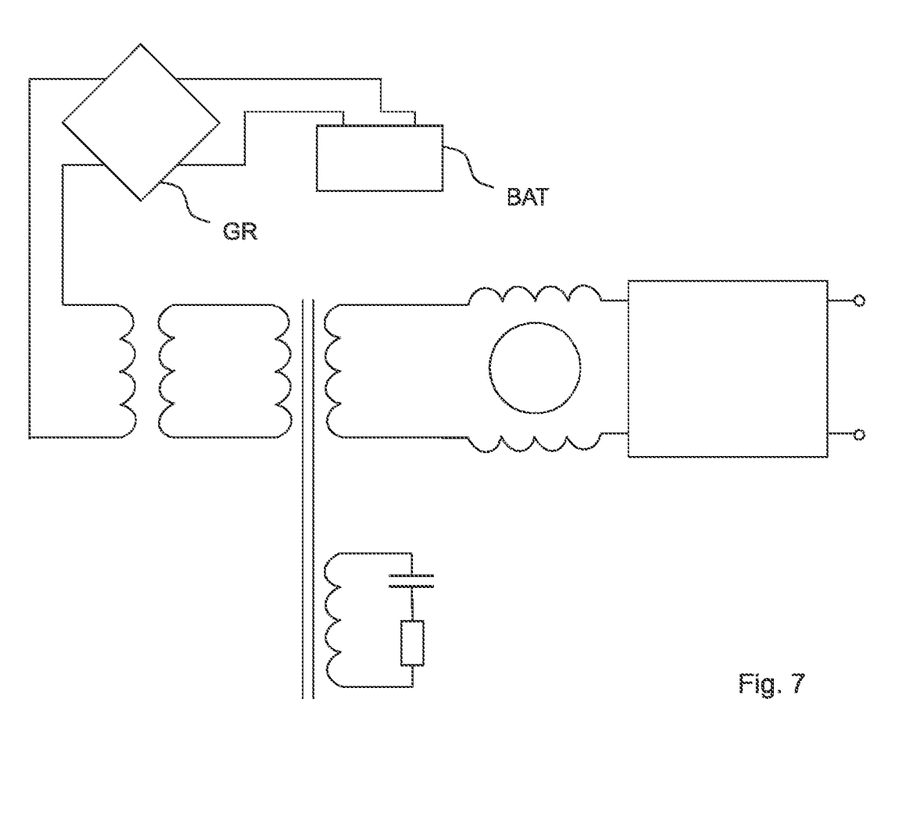
FIG. 7 shows the use of the rectifier for charging an energy source.

FIG. 7 shows the use of the wireless energy transfer device for coupling the electrical power into an electrical energy storage device, for example, the rechargeable battery of an automobile or of a mobile communication system.

Figure 8:
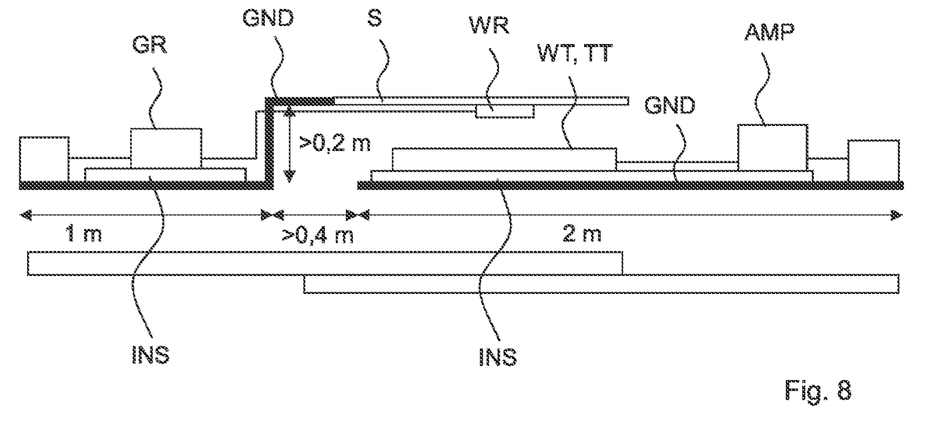
FIG. 8 shows the basic design of a test system.

FIG. 8 shows the physical arrangement of the components of a test setup in which the transmitting winding WT and the receiving winding WREC are arranged situated opposite one another but are physically separate from one another. The isolation transformer TT is arranged in the housing of the transmitting winding WT and is fed by an amplifier AMP. An electrical insulator, which can have a thickness of 10 cm, is arranged beneath the transmitting winding WT. A copper sheet at ground potential GND is arranged below the insulator INS. The receiving winding WREC is arranged above the transmitting winding WT. An electromagnetic shield S which is composed of aluminum and has a length of 1 m and a width of 1 m is arranged above said transmitting winding. The shield S is connected to a copper sheet at ground potential GND. The receiving winding WREC is interconnected to a rectifier GR, wherein a 5 cm-thick insulation layer INS is arranged between the rectifier GR and the copper sheet. The vertical offset between the shield S and the lower section of the copper sheet at ground potential GND, which copper sheet is connected to said shield, is greater than 20 cm. The horizontal section between the copper sheet below the transmitting winding WT and the section of the copper sheet below the rectifier GR at the same height is more than 0.4 m.

Figure 9:
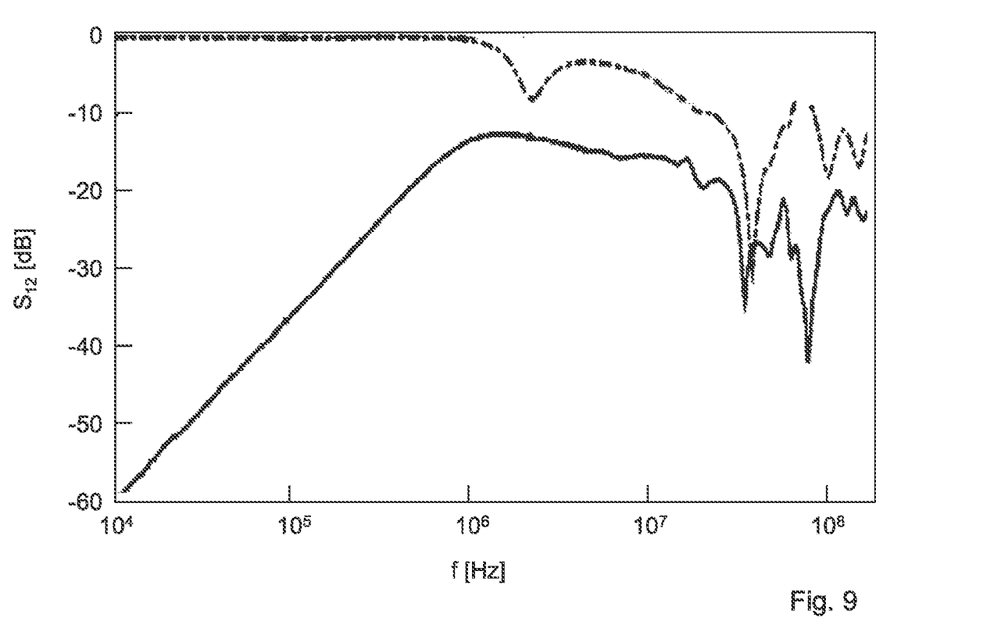
FIG. 9 shows the insertion loss (matrix element $S_{12}$) of an isolation transformer, split into a common-mode signal and a differential-mode signal.

FIG. 9 shows the insertion loss of the isolation transformer in a frequency-dependent manner for the common-mode signal (solid line, at the bottom) and for the differential-mode signal (dashed line, at the top). In a frequency region around 85 kHz, the isolation transformer is virtually transmissive to differential-mode signals, while common-mode signals are attenuated to a great extent.

Figure 10:
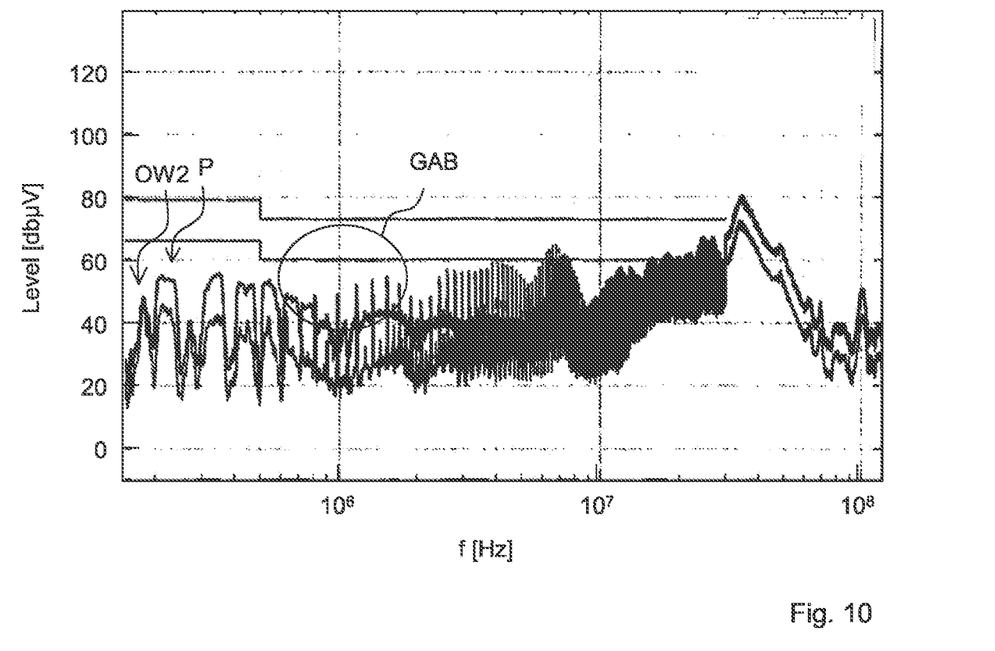
FIG. 10 shows further measured voltage values and associated permitted limit values.

FIG. 10 shows a typical voltage spectrum with peak P. The top curve shows the peak values measured by a peak value detector. The bottom curve shows the mean values measured by a mean value detector. Measurements were taken at the input of the inverter here. The suppression of resonance can be clearly seen, especially at 1 MHz. In addition, the second harmonic OW2 of 85 KHz is suppressed to a great extent. The frequency range GAB of approximately $10^{5.7}$ Hz to $10^{6.3}$ Hz is a particularly suitable operating range.

The isolation transformer and the energy transfer device are not limited to the forms shown. Energy transfer devices and isolation transformers with additional circuit elements are likewise covered by the scope of the invention.

The invention claimed is:

1. An isolation transformer comprising:
   an input winding;
   an output winding;
   a third winding;
   a capacitive element; and
   a resistive element,
   wherein the capacitive element, the resistive element and the third winding are connected in series,
   wherein the input winding, the output winding and the third winding are magnetically coupled, and
   wherein a capacitance C of the capacitive element and an electrical resistance R of the resistive element are chosen such that resonances of matching elements formed by parasitic reactance elements are reduced and an electromagnetic contamination of an area surrounding the output winding is reduced.

2. The isolation transformer according to claim 1, further comprising a transformer core,
   wherein the input winding is wound onto the transformer core,
   wherein the output winding is wound onto the transformer core, and
   where the third winding is wound onto the transformer core.

3. The isolation transformer according to claim 2, wherein the input winding and/or the third winding cover the output winding.

4. The isolation transformer according to claim 1, wherein the capacitive element, the resistive element and the third winding form an attenuation circuit for the resonances.

5. The isolation transformer according to claim 1,
   wherein 1 ohm $(\Omega) \leq R \leq 20\ \Omega$,
   wherein 0.5 nanofarad $(nF) \leq C \leq 10$ nF, and
   wherein the third winding has a number of turns N, where $5 \leq N \leq 40$.

6. The isolation transformer according to claim 5, wherein the input winding and the output winding have $N_1=N_2=29$ turns, R=10 ohm $(\Omega)$, C=2.2 nanofarad (nF) and N=23.

7. The isolation transformer according to claim 1, wherein the input winding and the output winding have an equal number of turns.

8. The isolation transformer according to claim 1, wherein the input winding has an inductance $L_I$, where 1 millihenry $(mH) \leq L_I \leq 10$ mH.

9. The isolation transformer according to claim 1, wherein the input winding has an inductance $L_I=3.67$ millihenry (mH).

10. The isolation transformer according to claim 1, wherein $0.5 \leq N_3/N_1 \leq 1.0$, wherein $N_1$ is the number of turns of the input winding and $N_3$ is the number of turns of the third winding.

11. An energy transfer device comprising:
    the isolation transformer according to claim 1;
    an inverter connected in series with the isolation transformer; and
    a common-mode choke connected in series between the inverter and the isolation transformer.

12. A system for wireless energy transfer comprising:
    the energy transfer device according to claim 11;

a rectifier connected in series with the isolation transformer;
a receiving winding connected in series between the rectifier and the isolation transformer; and
a transmitting winding connected in series between the receiving winding and the isolation transformer.

* * * * *